United States Patent
Wilson et al.

(10) Patent No.: US 9,601,108 B2
(45) Date of Patent: Mar. 21, 2017

(54) INCORPORATING AN EXOGENOUS LARGE-VOCABULARY MODEL INTO RULE-BASED SPEECH RECOGNITION

(71) Applicant: Microsoft Technology Licensing, LLC, Redmond, WA (US)

(72) Inventors: Travis Wilson, Redmond, WA (US); Salman Quazi, San Jose, CA (US); John Vicondoa, San Jose, CA (US); Pradip Fatehpuria, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 115 days.

(21) Appl. No.: 14/158,147

(22) Filed: Jan. 17, 2014

(65) Prior Publication Data
US 2015/0206528 A1    Jul. 23, 2015

(51) Int. Cl.
*G10L 15/00*    (2013.01)
*G10L 15/18*    (2013.01)
(Continued)

(52) U.S. Cl.
CPC .............. *G10L 15/06* (2013.01); *G10L 15/18* (2013.01); *G10L 15/30* (2013.01); *G10L 15/32* (2013.01); *G10L 15/193* (2013.01); *G10L 15/197* (2013.01)

(58) Field of Classification Search
None
See application file for complete search history.

(56) References Cited

U.S. PATENT DOCUMENTS 6,088,671 A    7/2000    Gould et al.
6,473,734 B1 *  10/2002    Dvorak ............ H04M 3/42204
                                                                704/235
(Continued)

FOREIGN PATENT DOCUMENTS

EP    1136983 A1    9/2001
EP    1475778       11/2004
(Continued)

OTHER PUBLICATIONS

Miranda, et al., "A Platform of Distributed Speech Recognition for the European Portuguese Language", In Proceedings of 8th International Conference on Computational Processing of the Portuguese Language, Sep. 8, 2008, 10 pages.
(Continued)

*Primary Examiner* — Satwant Singh

(57) ABSTRACT

Incorporation of an exogenous large-vocabulary model into rule-based speech recognition is provided. An audio stream is received by a local small-vocabulary rule-based speech recognition system (SVSRS), and is streamed to a large-vocabulary statistically-modeled speech recognition system (LVSRS). The SVSRS and LVSRS perform recognitions of the audio. If a portion of the audio is not recognized by the SVSRS, a rule is triggered that inserts a mark-up in the recognition result. The recognition result is sent to the LVSRS. If a mark-up is detected, recognition of a specified portion of the audio is performed. The LVSRS result is unified with the SVSRS result and sent as a hybrid response back to the SVSRS. If the hybrid-recognition rule is not triggered, an arbitration algorithm is evoked to determine whether the SVSRS or the LVSRS recognition has a lesser word error rate. The determined recognition is sent as a response to the SVSRS.

20 Claims, 9 Drawing Sheets

(51) Int. Cl.
*G10L 15/04* (2013.01)
*G10L 21/00* (2013.01)
*G10L 15/06* (2013.01)
*G10L 15/32* (2013.01)
*G10L 15/30* (2013.01)
G10L 15/193 (2013.01)
G10L 15/197 (2013.01)

(56) References Cited

U.S. PATENT DOCUMENTS

| | | | |
|---|---|---|---|
| 6,487,534 B1 * | 11/2002 | Thelen | G10L 15/26 704/270 |
| 6,523,061 B1 | 2/2003 | Halverson et al. | |
| 6,546,401 B1 | 4/2003 | Lizuka et al. | |
| 6,609,091 B1 | 8/2003 | Budzinski | |
| 6,738,743 B2 | 5/2004 | Sharma et al. | |
| 6,745,161 B1 | 6/2004 | Arnold et al. | |
| 6,839,669 B1 | 1/2005 | Gould et al. | |
| 7,013,275 B2 | 3/2006 | Arnold et al. | |
| 7,174,299 B2 * | 2/2007 | Fujii | G10L 15/32 704/270 |
| 7,228,277 B2 | 6/2007 | Nagashima | |
| 7,401,132 B1 | 7/2008 | Krumel et al. | |
| 7,624,018 B2 | 11/2009 | Chambers et al. | |
| 7,668,718 B2 * | 2/2010 | Kahn | G10L 15/063 704/270 |
| 7,716,051 B2 | 5/2010 | Dow et al. | |
| 7,747,782 B2 | 6/2010 | Hunt et al. | |
| 8,224,644 B2 | 7/2012 | Krumel et al. | |
| 8,249,877 B2 | 8/2012 | Koll | |
| 8,364,481 B2 | 1/2013 | Strope et al. | |
| 8,930,194 B2 * | 1/2015 | Newman | G10L 15/30 379/88.03 |
| 8,949,130 B2 * | 2/2015 | Phillips | G10L 15/30 382/190 |
| 8,972,263 B2 * | 3/2015 | Stonehocker | G10L 15/30 704/201 |
| 2002/0143551 A1 | 10/2002 | Sharma et al. | |
| 2003/0177009 A1 | 9/2003 | Odinak et al. | |
| 2003/0233237 A1 | 12/2003 | Garside et al. | |
| 2004/0098263 A1 | 5/2004 | Hwang et al. | |
| 2004/0107088 A1 | 6/2004 | Budzinski | |
| 2005/0102142 A1 | 5/2005 | Soufflet et al. | |
| 2007/0043566 A1 * | 2/2007 | Chestnut | G10L 15/075 704/257 |
| 2007/0043687 A1 | 2/2007 | Bodart et al. | |
| 2007/0067305 A1 | 3/2007 | Ives et al. | |
| 2007/0179778 A1 | 8/2007 | Gong et al. | |
| 2007/0276651 A1 | 11/2007 | Bliss et al. | |
| 2008/0005057 A1 | 1/2008 | Ozzie et al. | |
| 2008/0154870 A1 * | 6/2008 | Evermann | G06F 17/30867 |
| 2009/0177462 A1 * | 7/2009 | Alfven | G06F 17/289 704/3 |
| 2010/0114577 A1 | 5/2010 | Hayn et al. | |
| 2010/0161328 A1 | 6/2010 | Krumel et al. | |
| 2011/0288857 A1 | 11/2011 | Carraux et al. | |
| 2011/0289076 A1 | 11/2011 | Boyle et al. | |
| 2012/0215539 A1 | 8/2012 | Juneja | |
| 2012/0296644 A1 | 11/2012 | Koll | |
| 2013/0060571 A1 | 3/2013 | Soemo et al. | |
| 2013/0085753 A1 | 4/2013 | Bringert et al. | |
| 2013/0132084 A1 | 5/2013 | Stonehocker et al. | |
| 2013/0346078 A1 | 12/2013 | Gruenstein et al. | |
| 2014/0059603 A1 | 2/2014 | Lee et al. | |
| 2014/0173440 A1 * | 6/2014 | Dal Mutto | G06F 3/017 715/728 |
| 2014/0278411 A1 * | 9/2014 | Cheung | G10L 15/18 704/240 |
| 2015/0120288 A1 | 4/2015 | Thomson et al. | |
| 2015/0281401 A1 | 10/2015 | Le et al. | |

FOREIGN PATENT DOCUMENTS

| | | |
|---|---|---|
| JP | H10171490 A | 6/1998 |
| WO | 02103675 A1 | 12/2002 |
| WO | 2009145796 | 12/2009 |

OTHER PUBLICATIONS

"International Search Report & Written Opinion Received for PCT Application No. PCT/US2015/023228", Mailed Date: Jul. 29, 2015, 9 Pages.

PCT International Search Report and Written Opinion in International Application PCT/US2015/010943, mailed Mar. 9, 2015, 11 pgs.

Beutler, Rene et al., "Integrating Statistical and Rule-Based Knowledge for Continuous German Speech Recognition", 11, Sep. 1, 2003, 4 pgs.

"Speech Recognition in Office XP", Microsoft Corporation, http://www.microsoft.com/office/previous/xp/speech/asp, May 30, 2001, pp. 1-3.

"Using Speech Recognition for the First Time in Office", Microsoft Corporation, http://office.microsoft.com/en-us/assistance/HA010565111033.aspx, pp. 1-3.

"VoiceXML and Next-Generation Voice Services", Adam Hocek, MXL 2002 Proceedings by deepX, www.RenderX.com, pp. 1-15.

"Your Pad or MiPad", Microsoft Corporation, http://research.microsoft.com/research/srg/mipad.aspx, 2006, pp. 1-2.

Acero, et al., "Live Search for Mobile: Web Services by Voice on the Cellphone", In IEEE International Conference on Acoustics, Speech and Signal Processing, published Mar. 31, 2008, Available at: http://ieeexplore.ieee.org/stamp/stamp.jsp?arnumber=4518845&isnumber=4517521, 4 pgs.

Apple—iOS 7—Siri, Published on: Sep. 15, 2012, Available at: http://www.apple.com/ios/siri/, 6 pgs.

Barlas, Omar, "ILLUMINATOR—Natural User Interface Application to Control other Windows Apps", Published on: Aug. 21, 2013, Available at: http://www.codeproject.com/Articles/640283/ILLUMINATOR-Natural-User-Interface-Application-to, 5 pgs.

IBM Via Voice Gold, IBM, pp. 1-46.

Mace, Michael, "Mobile Opportunity", Web 3.0, Oct. 14, 2008, http://mobileopportunity.blogspot.com/2005/11/web-30.html., pp. 1-9.

Morde, Ashutosh, et al., "A Multimodal System for Accessing Driving Directions"; DAS 2002, LNCS 2423, 2002, http://www.springerlink.com/content/tg3w66jjfu1 vahuk/fulltext.pdf, pp. 556-567.

Nusca, Andrew, "How Apple's Siri Really Works", Published on: Nov. 3, 2011, Available at: http://www.zdnel.com/blog/btl/how-apples-siri-really-works/62461, 9 pgs.

O'Grady, Jason D., "Siri hacked to work with Spotify, Instagram and other third-party apps", Published on: Mar. 5, 2014, Available at: http://www.zdnet.com/siri-hacked-to-work-with-spotify-instagram-and-other-third-party-apps-7000027023/, 6 pgs.

Savitz, Eric, "Beyond Voice Recognition: It's the Age of Intelligent Systems", Published on: Jan. 14, 2013, Available at: http://www.forbes.com/sites/ciocentral/2013/01/11 /beyond-voice-recognition-its-the-age-of-intelligent-systems/, 5 pgs.

Turnen, Markku, et al.: "Spoken and Multimodal Communication Systems in Mobile Settings", A. Esposito et al. (Eds.), Verbal and Nonverbal Commun. Behaviours, LNAI 4775, 2007, http://www.springerlink.com/content/75t7x54587827240/fulltext.pdf., pp. 227-241.

U.S. Appl. No. 10/799,356, Advisory Action mailed Mar. 14, 2008, 3 pgs.

U.S. Appl. No. 10/799,356, Amendment and Response filed Feb. 13, 2009, 5 pgs.

U.S. Appl. No. 10/799,356, Amendment and Response filed Feb. 19, 2008, 5 pgs.

U.S. Appl. No. 10/799,356, Amendment and Response filed Jul. 10, 2009, 12 pgs.

U.S. Appl. No. 10/799,356, Amendment and Response filed Sep. 7, 2007, 3 pgs.

(56) References Cited

OTHER PUBLICATIONS

U.S. Appl. No. 10/799,356, Appeal Brief filed Jul. 21, 2008, 17 pgs.
U.S. Appl. No. 10/799,356, Notice of Allowance mailed Sep. 17, 2009, 6 pgs.
U.S. Appl. No. 10/799,356, Office Action mailed Oct. 8, 2008, 10 pgs.
U.S. Appl. No. 10/799,356, Office Action mailed Nov. 14, 2008, 9 pgs.
U.S. Appl. No. 10/799,356, Office Action mailed Nov. 19, 2007, 10 pgs.
U.S. Appl. No. 10/799,356, Office Action mailed Apr. 17, 2009, 9 pgs.
U.S. Appl. No. 10/799,356, Office Action mailed Jun. 5, 2007, 8 pgs.
U.S. Appl. No. 12/337,810, Office Action mailed Nov. 30, 2011, 7 pgs.
U.S. Appl. No. 12/337,810, Amendment and Response filed Feb. 29, 2012, 12 pgs.
U.S. Appl. No. 12/337,810, Notice of Allowance mailed Mar. 15, 2012, 8 pgs.
PCT International Preliminary Report on Patentability in International Application PCT/US2015/010943, mailed Feb. 5, 2016, 5 pgs.
PCT 2nd Written Opinion Received in Application No. PCT/US2015/023228, mailed Feb. 8, 2016, 5 pgs.
PCT International Preliminary Report on Patentability Issued in International Application PCT/US2015/023228, mailed Jun. 16, 2016, 6 pgs.
U.S. Appl. No. 14/480,422, Office Action mailed Sep. 13, 2016, 26 pgs.

* cited by examiner

INCORPORATING AN EXOGENOUS LARGE-VOCABULARY MODEL INTO RULE-BASED SPEECH RECOGNITION

BACKGROUND

Speech recognition systems can largely be classified into two types of systems: a rule-based system that utilizes a small-vocabulary and produces highly accurate results, or an open-ended, statistical-based system that utilizes a vast vocabulary and provides a breadth of recognition at a cost of specific accuracy.

Speech recognition has become a useful tool on smaller form devices, such as mobile phones, tablet computers, wearable devices (e.g., smart watches, etc.), portable media players, etc. Users may use a speech recognition system with various types of applications to perform actions, answer questions, make recommendations, etc. For example, a user may speak a command to launch a text messaging application, speak a text message, and then speak a command to send the text message. Speech recognition on such devices may be constrained by hardware, software, and/or processing/memory capabilities. Accordingly, smaller form devices may comprise a rule-based speech recognition system as opposed to a large-vocabulary model that allows for open-ended speech because of the amount of memory and processing power such a system may consume.

A large-vocabulary speech recognition system may be available on a separate system, for example, on a remote server. Some smaller form devices may rely on a network-based large-vocabulary speech recognition system to perform recognition; however, access to a network may not always be available, and hosting a large-vocabulary system on a smaller form device may not be feasible from a computational perspective.

Oftentimes, there exists a need to combine advantages of both types of speech recognition systems, for example, where a portion of a spoken utterance from a user may need to be matched with high accuracy, and another portion of the spoken utterance may need to be more inspecifically matched. It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing an incorporation of an exogenous large-vocabulary model into rule-based speech recognition. A combination of constrained, rule-based recognition on a local device may be leveraged with remote open-ended statistically-based recognition to deliver recognition results that incorporate both the specificity of device-based rules and the breadth of a large language model.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
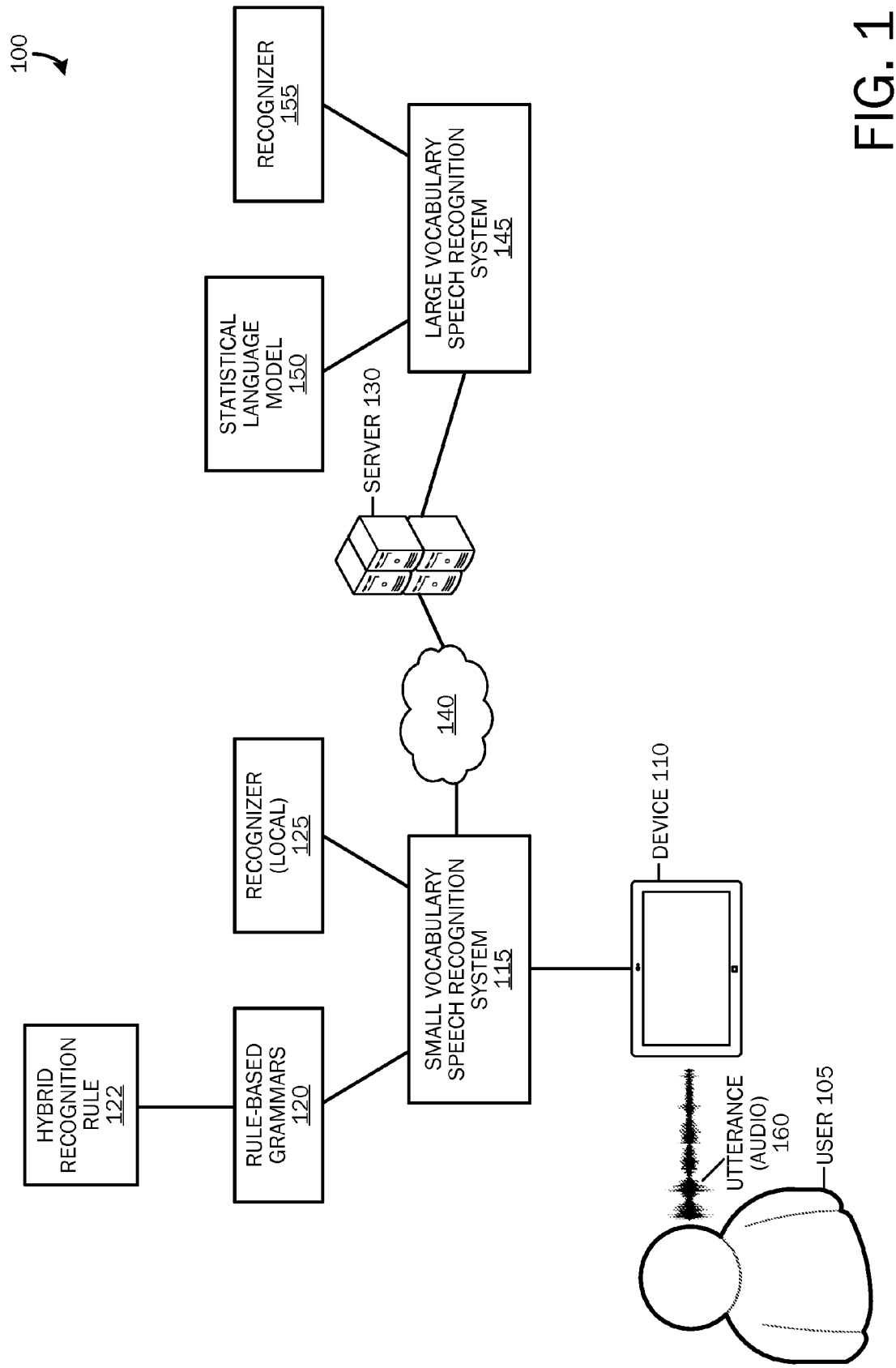
FIG. 1 is a block diagram of one embodiment of a system for providing an incorporation of an exogenous large-vocabulary model into rule-based speech recognition.

Embodiments of the present invention are directed to providing an incorporation of an exogenous large-vocabulary model into rule-based speech recognition. A user of a device (e.g., a mobile phone, a tablet device, etc.) may provide an audio stream to the device. For example, the user may speak a command and/or dictate a message. Recognition of the audio stream may be performed by a small-vocabulary rule-based speech recognition system on the local device. According to an embodiment, the audio stream may also be streamed to a remote large-vocabulary speech recognition system for recognition using a statistical language model. The large-vocabulary speech recognition system recognition may occur concurrently with the small-vocabulary rule-based speech recognition system recognition.

The small-vocabulary rule-based speech recognition system may comprise a hybrid recognition rule that may be triggered when a portion of the audio is not recognized by the small-vocabulary rule-based speech recognition system. A mark-up indicative of an unrecognized portion(s) may be inserted into the recognition result. The recognition result including any mark-ups may be sent to the large-vocabulary speech recognition system. Upon detection of a mark-up, recognition of a portion of the audio specified by the mark-up may be performed using the statistical language model. The result of the large-vocabulary speech recognition system may be unified with the small-vocabulary rule-based speech recognition system result and sent as a hybrid recognition response back to the small-vocabulary speech recognition system.

Embodiments may also comprise an arbitration algorithm pre-trained to reduce word error rates of recognitions. The arbitration algorithm may be operable to determine whether to use the small-vocabulary speech recognition system recognition result, the large-vocabulary speech recognition system recognition result, or, if the hybrid recognition rule is triggered, the hybrid recognition result. According to an embodiment, the arbitration algorithm may be network-based and may be evoked prior to sending a recognition response to the small-vocabulary speech recognition system.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

Referring now to the drawings, in which like numerals represent like elements, various embodiments will be described. FIG. 1 is a block diagram illustrating a system architecture 100 for providing an incorporation of an exogenous large-vocabulary model into rule-based speech recognition. The system 100 includes a device 110 comprising a small-vocabulary speech recognition system 115. The device 110 may be one of a variety of suitable computing devices described below with reference to FIGS. 4 through 6. For example, the device 110 may include a tablet computing device, a desktop computer, a mobile communication device, a laptop computer, a laptop/tablet hybrid computing device, a gaming device, a media playing device, or other type of computing device for executing applications for performing a variety of tasks.

According to embodiments, the small-vocabulary speech recognition system (SVSRS) 115 may include a recognizer 125 and rule-based grammars 120. According to embodiments, when a user 105 speaks an utterance to the device 110, the audio 160 may be received by the SVSRS 115 for rule-based speech recognition. Recognition of the audio may be performed by the SVSRS 115 using the recognition rules (rule-based grammars 120) authored on the device 110. According to an embodiment, the rule-based grammars 120 may be authored using an XML format, for example, in a speech recognition grammar specification (SRGS) format. The rule-based grammars 120 may include a hybrid recognition rule 122.

According to an embodiment, the audio 160 may be simultaneously streamed to a large vocabulary speech recognition system (LVSRS) 145. The LVSRS 145 may include a recognizer 155 and an open-ended statistical language model 150 operable to perform open-ended statistically-based recognition. According to one embodiment, the LVSRS 145 may be locally-based. According to another embodiment and as illustrated in FIG. 1, the LVSRS 145 may be cloud-hosted and provided as a service. For example, the LVSRS 145 may be communicatively connected to a server device 130 (or a plurality of server devices) by way of a network 140, such as an intranet, extranet, or the Internet.

Figure 2:
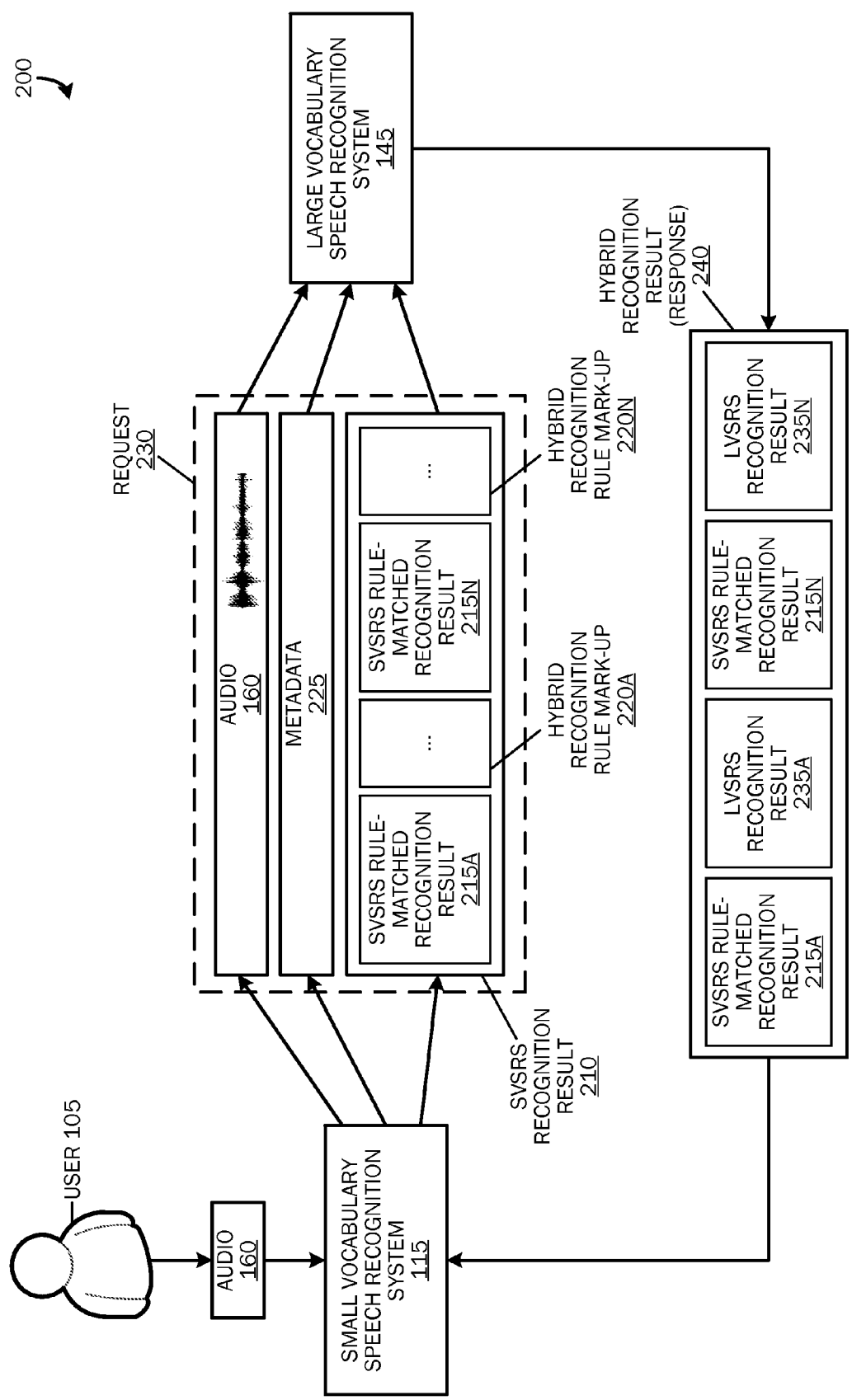
FIG. 2 is a block diagram illustrating a request and response transaction between a small-vocabulary speech recognition system and a large-vocabulary speech recognition system.

With reference now to FIG. 2, a block diagram of a request and response transaction 200 between the SVSRS 115 and the LVSRS 145 is illustrated. As described above, an utterance or audio 160 may be received by the SVSRS 115, and may be streamed to the LVSRS 145 for simultaneous recognition. As the SVSRS 115 is performing its rule-based recognition, the sequence of rules may be matched by the recognition system. The SVSRS rule-matched recognition results 215 may be inserted into a recognition result 210, serialized, and sent as a request 230 to the LVSRS 145.

Consider for example that a user 105 utters a statement such as, "call Bob." The utterance (audio 160) may be easily recognized by the rule-based grammars of the SVSRS 115. Accordingly, the SVSRS recognition result 210 may comprise a transcription of the utterance "call Bob" (SVSRS rule-matched recognition result 215).

If a portion of the audio is not matched by a rule, the hybrid recognition rule 122 may be triggered, and a place holder, herein referred to as a hybrid recognition rule mark-up 220, may be inserted into the recognition result 210. The hybrid recognition rule 122 may be triggered multiple times for a single audio stream 160. Accordingly, a recognition result 210 may comprise multiple hybrid recognition rule mark-ups 220A-N, as well as multiple SVSRS rule-matched recognition results 215A-N.

For example, if a user utters a statement such as, "text Bob I may be running a little late, and remind me to buy some cookies." Portions of the utterance may be recognized by the rule-based grammars of the SVSRS 115. For example, the SVSRS 115 may be able to recognize "text Bob" and "remind me to;" however, the other portions of the audio 160 ("I may be running a little late, and" and "buy some cookies") may not be recognizable by the SVSRS 115. Accordingly, "text Bob" may be recognized and provided as a first SVSRS rule-matched recognition result 215A in the SVSRS recognition result 210. "I may be running a little late" may not be recognized, and thus may trigger the hybrid recognition rule 122. Consequently, a first hybrid recognition rule mark-up 220A may be inserted into the SVSRS recognition result 210. "Remind me to" may be recognized and provided as a second SVSRS rule-matched recognition result 215B in the SVSRS recognition result 210. "Buy some cookies" may not be recognized, and again, the hybrid recognition rule 122 may be triggered and a second hybrid recognition rule mark-up 220B may be inserted into the SVSRS recognition result 210.

The SVSRS recognition result 210 including any SVSRS rule-matched recognition results 215 and any hybrid recognition rule mark-ups 220 may be structured and serialized as part of a request 230 to the LVSRS 145. The request 230 may also comprise the audio 160 and metadata 225, for example, client context, connection information, etc. According to an embodiment, the SVSRS recognition result 210 may be sent as a complete recognition result (including SVSRS rule-matched recognition results 215 and hybrid recognition rule mark-ups 220) after the SVSRS 115 has completed its local recognition. According to another embodiment, intermediate SVSRS recognition results may be serialized and sent as the user 105 is speaking.

According to an embodiment, a SVSRS recognition result 210 may comprise a confidence levels associated with rule-matched portions of an audio 160. The below example is a sample recognition phrase (SVSRS recognition result 210) comprising confidence levels for an utterance, "text Sam that I need to run to the store after work."

```
{
    Text         : "text Sam that ...",
    Confidence   : "0.8712346",
    RuleName     : "VoiceAgent_Text",
    Phrases      : [
        {
            Text         : "text",
            Rule         : "VoiceAgent_Text",
            Confidence   : "0.734724",
        },
        {
            Text         : "Sam",
            Rule         : "Contact",
```

-continued

```
        Confidence   : "0.921274",
    },
    {
        Text         : "that",
        Rule         : "VoiceAgent_Text",
        Confidence   : "0.734714",
    },
    {
        Text         : "....",
        Rule         : "ShortMessageDictation",
        Confidence   : "1.00000",
    }
    ]
}
EXAMPLE: SVSRS RECOGNITION RESULT
```

The request 230 may be received and deserialized by the LVSRS 145. The LVSRS 145 may parse the SVSRS recognition result 210 and determine if it comprises any hybrid recognition rule mark-ups 220. For example, a hybrid recognition rule markup 220 may be a mark-up such as, " . . . " as illustrated in the above example. If the SVSRS recognition result 210 comprises a hybrid recognition rule mark-up 220, the LVSRS 145 may cancel its recognition that it had started simultaneously with the SVSRS recognition, and restart a recognition using the received SVSRS recognition result 210 as a template. The LVSRS 145 may perform open-ended statistically-based recognition on the portion(s) of the audio 160 specified by the hybrid recognition rule mark-up(s) 220.

The result(s) of the LVSRS 145 (herein referred to as LVSRS recognition result(s) 235) may be pieced together with the SVSRS rule-matched recognition result(s) 215. The combination of the LVSRS and the SVSRS recognition results (herein referred to as a hybrid recognition result) 240 may be serialized and sent as a response to the SVSRS 115.

Figure 3A:
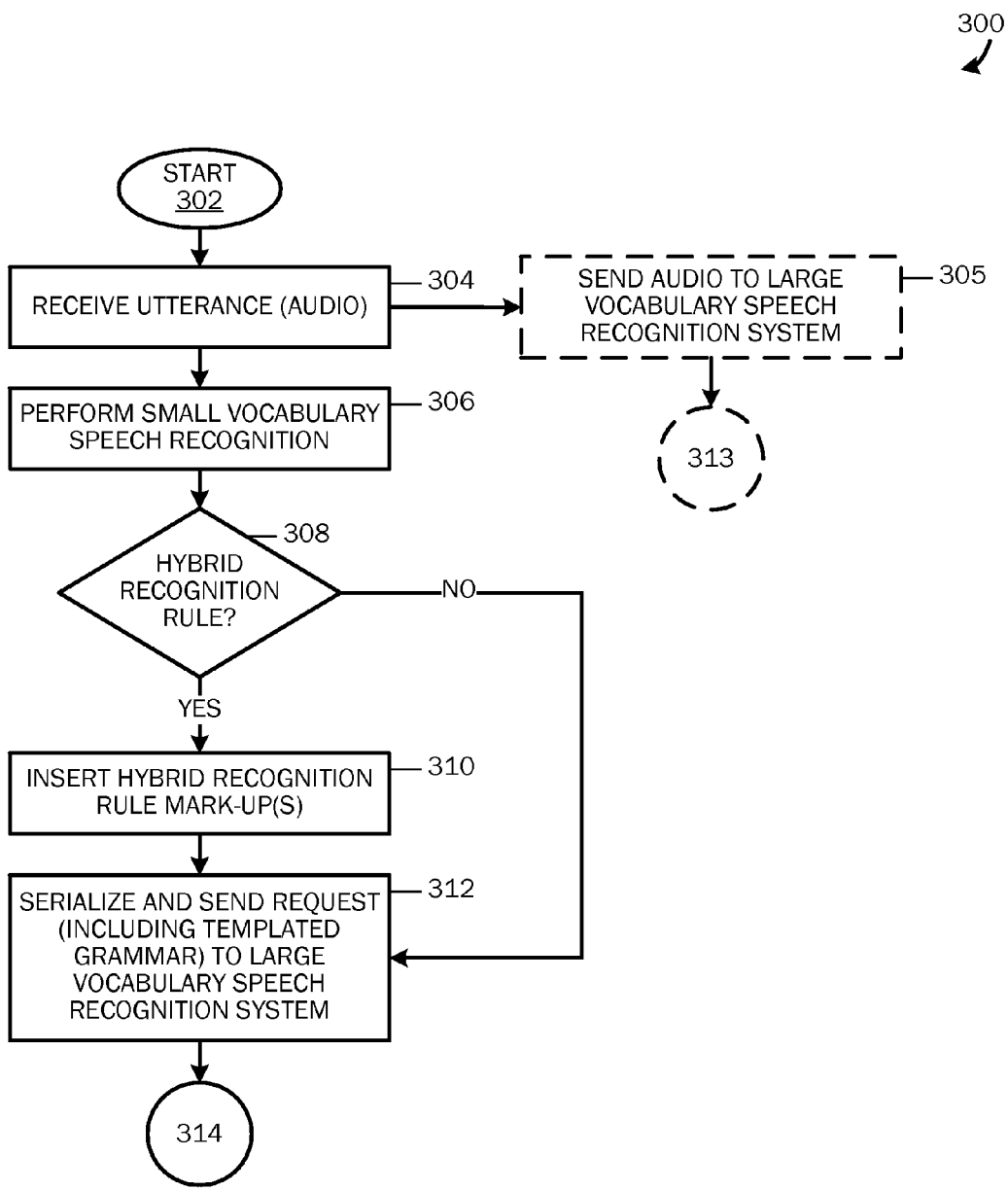
FIGS. 3A-3C illustrate a flow chart of a method for providing an incorporation of an exogenous large-vocabulary model into rule-based speech recognition.
Figure 3B:
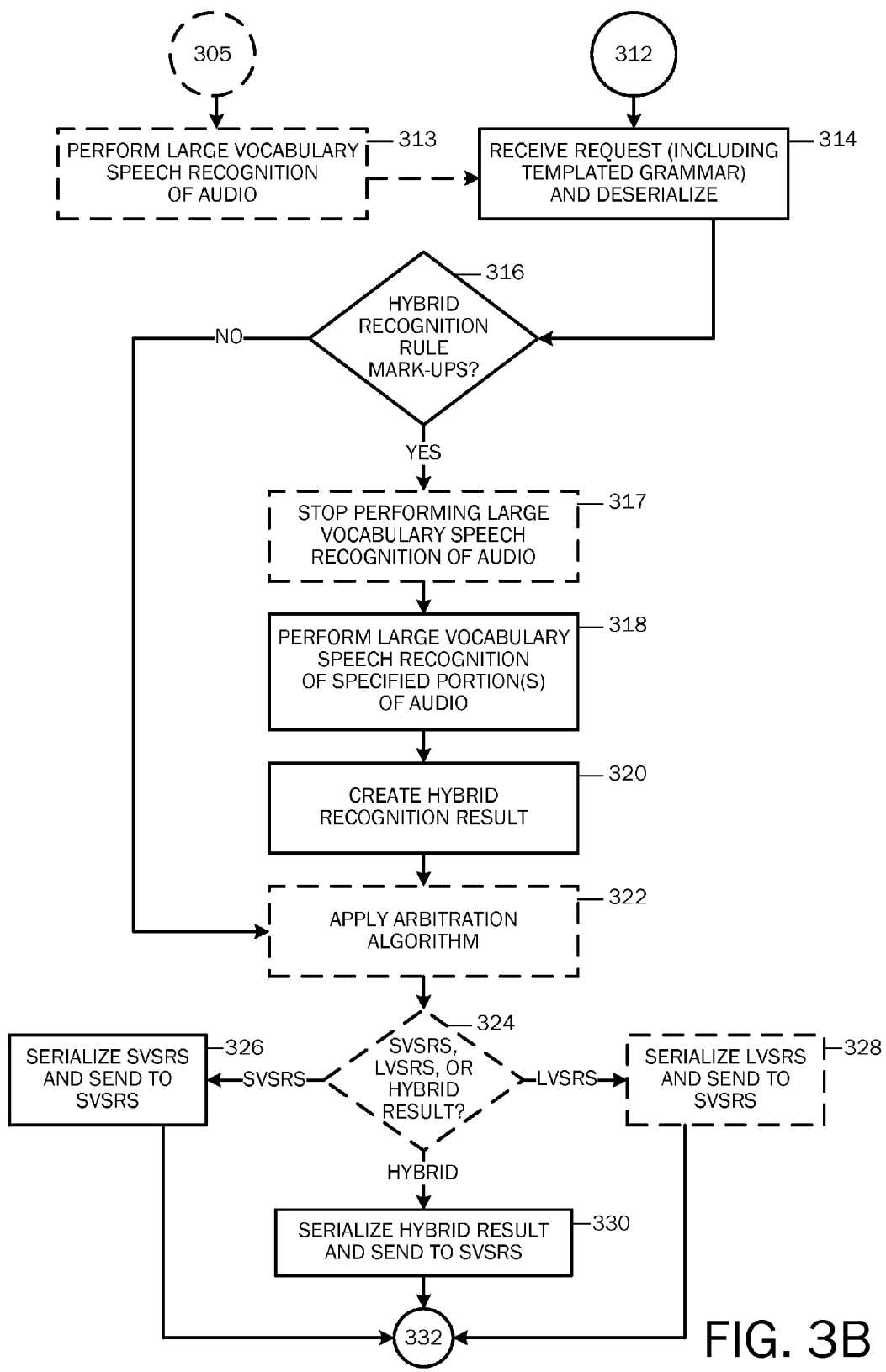
Figure 3C:
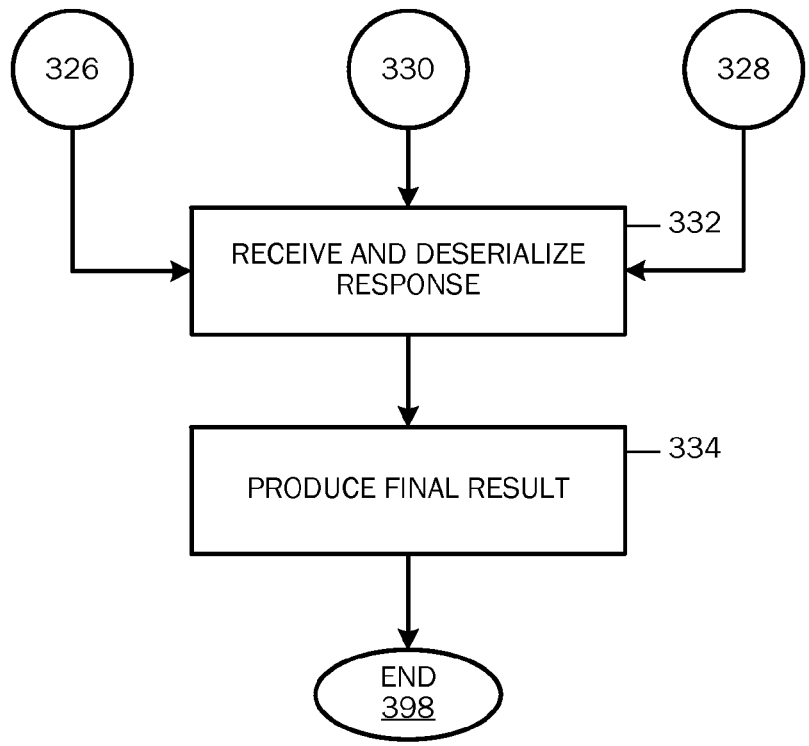

FIGS. 3A-3C illustrates one embodiment of a method 300 for providing an incorporation of an exogenous large-vocabulary model into rule-based speech recognition. FIGS. 3A and 3C illustrate SVSRS 115 processes, and FIG. 3B illustrates LVSRS 145 processes. Referring now to FIG. 3A, the method 300 starts at OPERATION 302 and proceeds to OPERATION 304 where audio 160 is received. For example, a user 105 may initiate a speech recognition feature on his/her device 110 to perform a task (e.g., to create a text message, perform an Internet search, transcribe notes into a notes application, etc.). The user 105 may speak an utterance, such as a command or a statement, into the device 110.

The method 300 may proceed from OPERATION 304 to OPERATION 306 where recognition may be performed by the SVSRS 115 using the recognition rules (rule-based grammars 120) authored on the device 110, and may also optionally proceed to OPERATION 305, where the audio 160 is sent to the LVSRS 145 for recognition. For example, the audio 160 may be concurrently recognized by the SVSRS 115 and the LVSRS 145. From OPERATION 305, the method may proceed to OPERATION 313, which will be described with reference to FIG. 3B.

While performing recognition at OPERATION 306, a determination may be made at DECISION OPERATION 308 whether the hybrid recognition rule 122 is triggered. As described above, during the rule-based recognition process, a sequence of rules may be matched with the audio 160 by the recognition system. If a portion of the audio 160 is not matched by a rule, the hybrid recognition rule 122 may be triggered.

If the hybrid recognition rule 122 is triggered, the method 300 may proceed to OPERATION 310, where a hybrid recognition rule mark-up 220 may be inserted into the recognition result 210. If the hybrid recognition rule 122 is not triggered, or after one or more hybrid recognition rule mark-ups 220 are inserted into the SVSRS recognition result 210, the method 300 may then proceed to OPERATION 312.

At OPERATION 312, the SVSRS recognition result 210, which may include SVSRS rule-matched recognition results 215 and/or hybrid recognition rule mark-ups 220 may be serialized and sent as a request 230 to the LVSRS 145. The request 230 may also comprise the audio 160 and metadata 225. As described above, the SVSRS recognition result 210 may be sent as a complete recognition result (including SVSRS rule-matched recognition results 215 and hybrid recognition rule mark-ups 220) after the SVSRS 115 has completed its local recognition, or may be sent as intermediate SVSRS recognition results while the user 105 is speaking.

Referring now to FIG. 3B, if the audio 160 is sent to the LVSRS 145 for concurrent recognition (OPERATION 305), the method 300 may proceed to OPERATION 313, where open-ended statistically-based recognition of the audio 160 may be performed by the LVSRS 145 while the SVSRS 115 is performed its rule-based recognition of the audio 160.

The method 300 may proceed from OPERATION 312 (FIG. 3A) and optionally from OPERATION 313 to OPERATION 314, where the request 230 (i.e., audio 160, SVSRS recognition result 210, and metadata 225) may be received and deserialized by the LVSRS 145.

The method 300 may proceed from OPERATION 314 to DECISION OPERATION 316, where the SVSRS recognition result 210 may be analyzed, and a determination may be made as to whether the SVSRS recognition result 210 comprises one or more hybrid recognition rule mark-ups 220.

If a determination is made at DECISION OPERATION 316 that the SVSRS recognition result 210 comprises one or more hybrid recognition rule mark-ups 220, the method 300 may proceed to OPERATION 317, where if the audio 160 is already being recognized by the LVSRS 145 (OPERATION 313), the LVSRS 145 may cancel the recognition.

The method 300 may proceed to OPERATION 318, where the LVSRS 145 may perform open-ended statistically-based recognition of the portions of the audio 160 specified by the one or more hybrid recognition rule mark-ups 220 in the SVSRS recognition result 210.

At OPERATION 320, the LVSRS 145 recognition result(s) 235A-N may be combined with the SVSRS rule-matched recognition result(s) 215A-N, and a hybrid recognition result 240 may be created.

The method 300 may optionally proceed from OPERATION 320 to OPERATION 322, or from DECISION OPERATION 316 (if a determination is made that the SVSRS recognition results 210 does not comprise a hybrid recognition rule mark-up 220), where an arbitration algorithm may be applied. As described above, the arbitration algorithm is an algorithm pre-trained to reduce word error rates of recognitions.

At DECISION OPERATION 324, a determination is made whether the SVSRS recognition result 210 or the LVSRS recognition result 235, or, if the hybrid recognition rule 122 is triggered, the hybrid recognition result 240 has a better recognition quality based on predefined features. If the SVSRS recognition result 210 comprises a hybrid recognition rule mark-up 220, the hybrid recognition result 240 may automatically be selected, serialized and sent to the SVSRS 115 (OPERATION 330).

If the SVSRS recognition result 210 does not comprise a hybrid recognition rule mark-up 220, and if the SVSRS recognition result 210 is determined to have a higher recognition quality than the LVSRS recognition result 235 at DECISION OPERATION 324, the method 300 may proceed to OPERATION 326, where the SVSRS recognition result 210 may be serialized and sent to the SVSRS 115.

If the SVSRS recognition result 210 does not comprise a hybrid recognition rule mark-up 220, and if the LVSRS recognition result 235 is determined to have a higher recognition quality than the SVSRS recognition result 210 at DECISION OPERATION 324, the method 300 may proceed to OPERATION 328, where the LVSRS recognition result 235 may be serialized and sent to the SVSRS 115. The method 300 may proceed to OPERATION 332 (FIG. 3C).

Referring now to FIG. 3C, the method 300 may proceed from either OPERATION 326, 328, or 330 to OPERATION 332, where a response (which may be the SVSRS recognition result 210, the LVSRS recognition result 235, or the hybrid recognition result 240) may be received and deserialized.

At OPERATION 334, a final result may be produced and applied to the task (e.g., to create a text message, perform an Internet search, transcribe notes into a notes application, etc.) for which the speech recognition feature was initiated. The method 300 may end at OPERATION 398.

While the invention has been described in the general context of program modules that execute in conjunction with an application program that runs on an operating system on a computer, those skilled in the art will recognize that the invention may also be implemented in combination with other program modules. Generally, program modules include routines, programs, components, data structures, and other types of structures that perform particular tasks or implement particular abstract data types.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
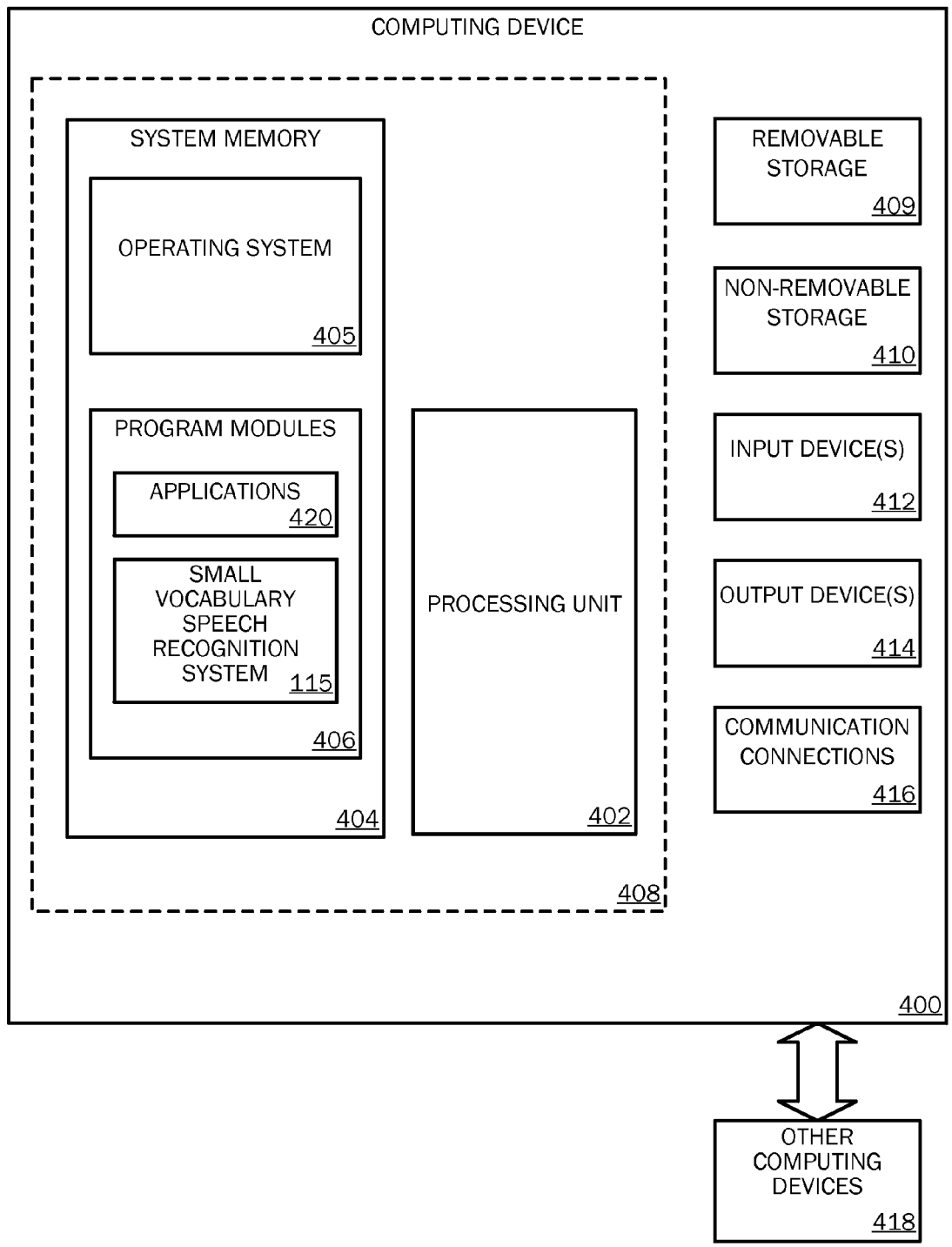
FIG. 4 is a block diagram illustrating example physical components of a computing device with which embodiments of the invention may be practiced.
Figure 5A:
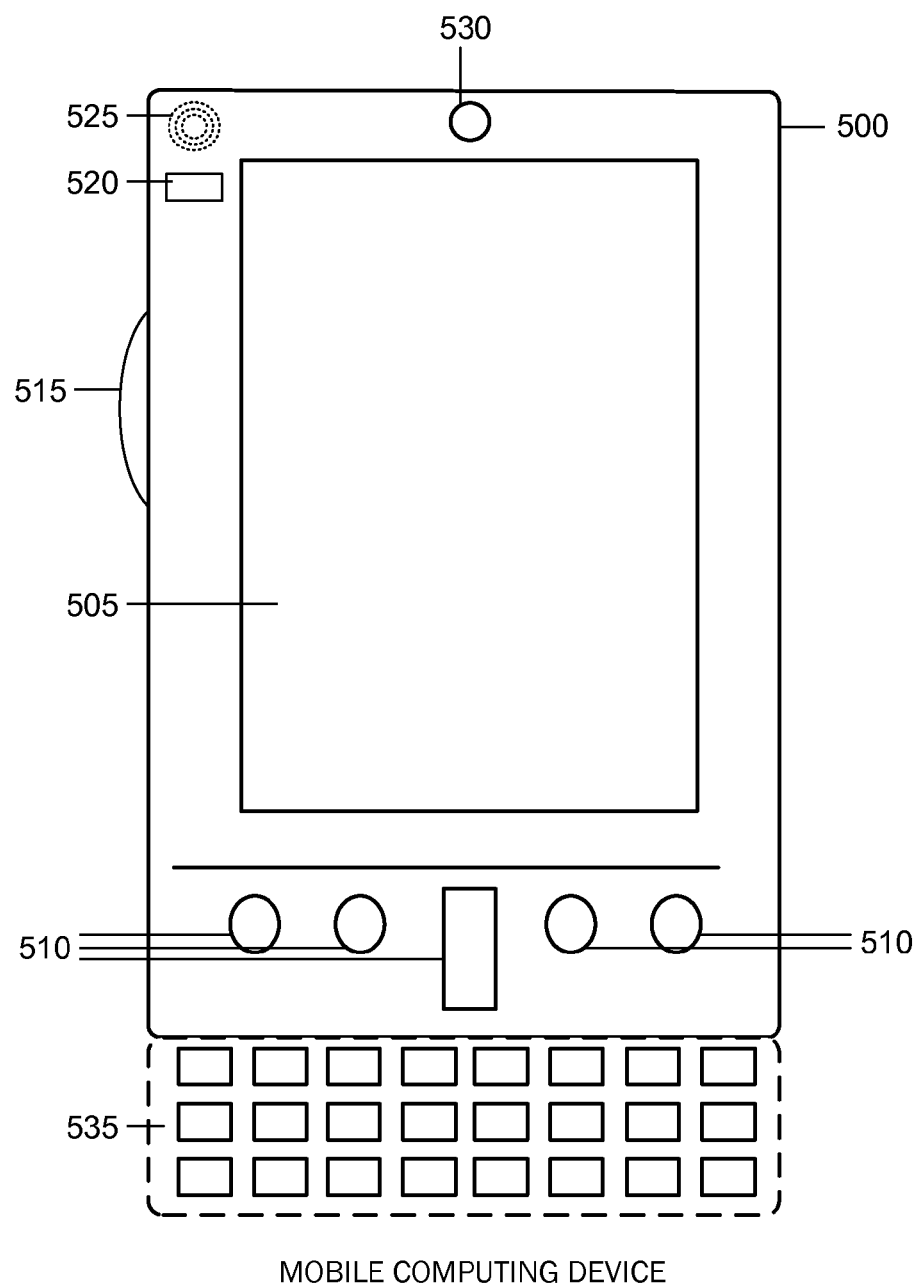
FIGS. 5A and 5B are simplified block diagrams of a mobile computing device with which embodiments of the present invention may be practiced.
Figure 5B:
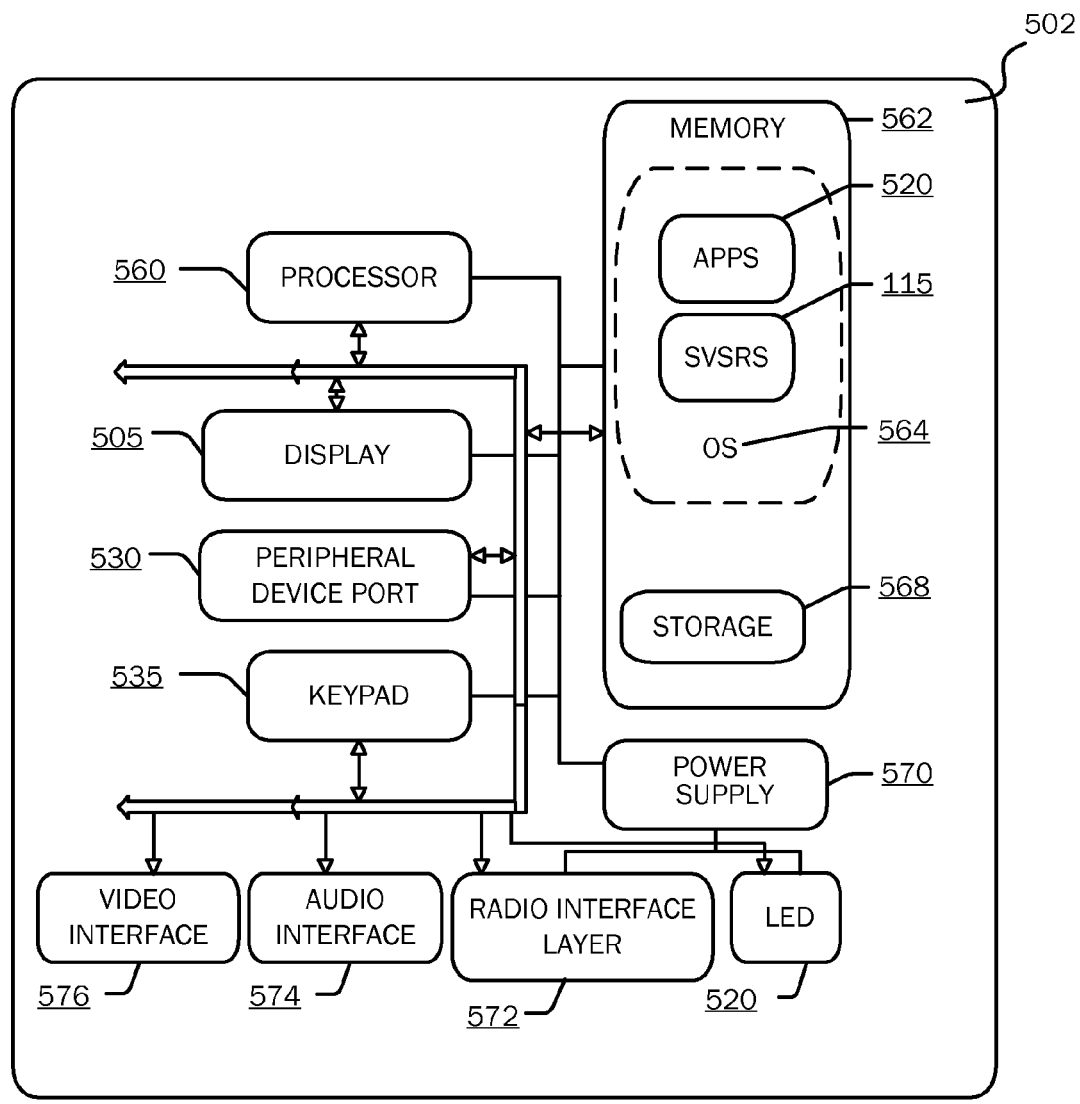
Figure 6:
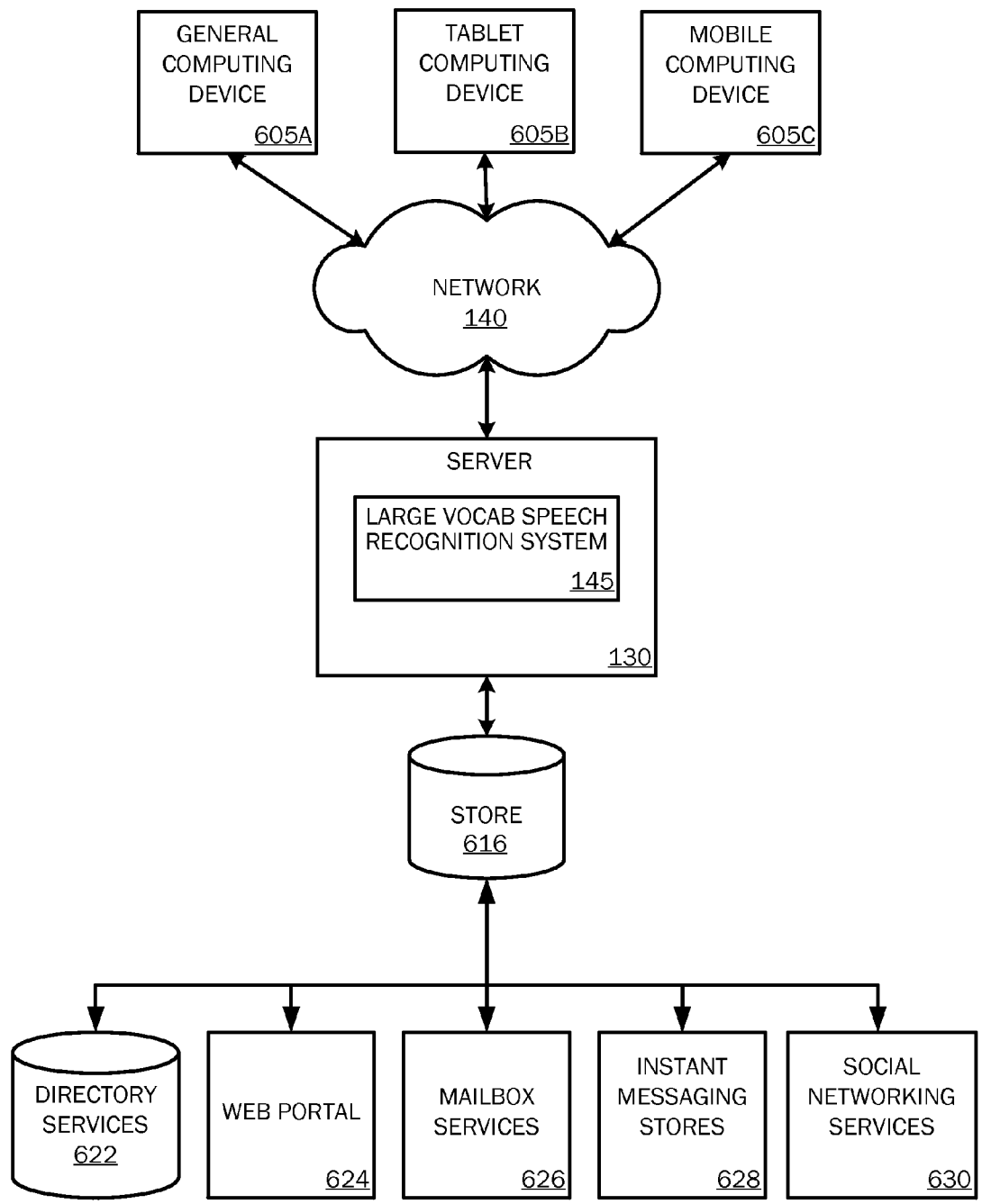
FIG. 6 is a simplified block diagram of a distributed computing system in which embodiments of the present invention may be practiced.

FIGS. 4-6 and the associated descriptions provide a discussion of a variety of operating environments in which embodiments of the invention may be practiced. However, the devices and systems illustrated and discussed with respect to FIGS. 4-6 are for purposes of example and illustration and are not limiting of a vast number of computing device configurations that may be utilized for practicing embodiments of the invention, described herein.

FIG. 4 is a block diagram illustrating physical components (i.e., hardware) of a computing device 400 with which embodiments of the invention may be practiced. The computing device components described below may be suitable for the device 110 and/or server 130 described above. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories. The system memory 404 may include an operating system 405 and one or more program modules 406 suitable for running software applications 420, such as the SVSRS 115. The operating system 405, for example, may be suitable for controlling the operation of the computing device 400. Furthermore, embodiments of the invention may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 may perform processes including, but not limited to, one or more of the stages of the method 300 illustrated in FIGS. 3A-C. Other program modules that may be used in accordance with embodiments of the present invention may include applications such as electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to providing incorporation of an exogenous large-vocabulary model 150 into rule-based speech recognition may be operated via application-specific logic integrated with other components of the computing device 400 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 400 may also have one or more input device(s) 412 such as a keyboard, a mouse, a pen, a sound input device, a touch input device, etc. The output device(s) 414 such as a display, speakers, a printer, etc. may also be included. The aforementioned devices are examples and others may be used. The computing device 400 may include one or more communication connections 416 allowing communications with other computing devices 418. Examples of suitable communication connections 416 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which embodiments of the invention may be practiced. With reference to FIG. 5A, one embodiment of a mobile computing device 500 for implementing the embodiments is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative embodiments, mobile computing device 500 may incorporate more or less input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some embodiments, the mobile computing device 500 incorporates a vibration transducer for providing the user with tactile feedback. In yet another embodiment, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one embodiment of a mobile computing device. That is, the mobile computing device 500 can incorporate a system (i.e., an architecture) 502 to implement some embodiments. In one embodiment, the system 502 is implemented as a "smart phone" capable of running one or more applications (e.g., browser, e-mail, calendaring, contact managers, messaging clients, games, and media clients/players). In some embodiments, the system 502 is integrated as a computing device, such as an integrated personal digital assistant (PDA) and wireless phone.

One or more application programs 520 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The SVSRS 115 may also be loaded into the memory 562 and run on or in associated with the operation system 564. The system 502 also includes a non-volatile storage area 568 within the memory 562. The non-volatile storage area 568 may be used to store persistent information that should not be lost if the system 502 is powered down. The application programs 520 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

The system 502 has a power supply 570, which may be implemented as one or more batteries. The power supply 570 might further include an external power source, such as an AC adapter or a powered docking cradle that supplements or recharges the batteries.

The system 502 may also include a radio 572 that performs the function of transmitting and receiving radio frequency communications. The radio 572 facilitates wireless connectivity between the system 502 and the "outside world," via a communications carrier or service provider.

Transmissions to and from the radio 572 are conducted under control of the operating system 564. In other words, communications received by the radio 572 may be disseminated to the application programs 520 via the operating system 564, and vice versa.

The visual indicator 520 may be used to provide visual notifications and/or an audio interface 574 may be used for producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present invention, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio 572 or via a distributed computing network. Similarly, such data/information may be readily transferred between computing devices for storage and use according to well-known data/information transfer and storage means, including electronic mail and collaborative data/information sharing systems.

FIG. 6 illustrates one embodiment of the architecture of a system for providing incorporation of an exogenous large-vocabulary model 150 into rule-based speech recognition, as described above. Content developed, interacted with, or edited in association with LVSRS 145 may be stored in different communication channels or other storage types. For example, various documents may be stored using a directory service 622, a web portal 624, a mailbox service 626, an instant messaging store 628, or a social networking site 630. The LVSRS 145 may use any of these types of systems or the like for providing incorporation of an exogenous large-vocabulary model 150 into rule-based speech recognition, as described herein. A server 130 may provide LVSRS 145 to clients. As one example, the server 130 may be a web server providing LVSRS 145 over the web. The server 130 may provide LVSRS 145 over the web to clients through a network 140. By way of example, the client computing device may be implemented and embodied in a personal computer 605A, a tablet computing device 605B and/or a mobile computing device 605C (e.g., a smart phone), or other computing device. Any of these embodiments of the client computing device may obtain content from the store 616.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

We claim:

1. A method for providing speech recognition by a computing device, comprising:
receiving an audio stream;
processing the audio stream by performing a rule-based speech recognition of the audio stream using rule-based grammars to generate a first recognition result comprising a rule-matched recognition result of a recognized portion of the audio stream and a mark-up specifying an unrecognized portion of the audio stream;
sending the first recognition result to a large vocabulary speech recognition system that processes the first recognition result and the mark-up using a statistical-based recognition of the unrecognized portion of the audio stream; and
receiving a response, including a recognition of the unrecognized portion, from the large vocabulary speech recognition system.

2. The method of claim 1, further comprising sending the audio stream and metadata to the large vocabulary speech recognition system.

3. The method of claim 1, wherein the response comprises the rule-matched recognition portion of the audio stream and a second recognition result.

4. The method of claim 3, wherein the second recognition result comprises a large vocabulary speech recognition system recognition result of the unrecognized portion.

5. The method of claim 1, wherein the response comprises a second recognition result produced by the large vocabulary speech recognition system.

6. The method of claim 5, further comprising producing a final result based on the first recognition result and the second recognition result.

7. The method of claim 6, wherein producing the final result comprises replacing the mark-up in the first recognition result with at least a portion of the second recognition result.

8. The method of claim 1, further comprising performing a task based on the first recognition result and the second recognition result.

9. A system for providing incorporation of an exogenous large-vocabulary model into rule-based speech recognition, comprising:
one or more processors; and
a memory coupled to the one or more processors, the one or more processors operable to:
receive an audio stream;
perform a rule-based speech recognition of the audio stream using a small vocabulary speech recognition system;
produce a first recognition result comprising a rule-matched recognition result of a portion of the audio stream that is recognized by the rule-based speech recognition;
insert a mark-up in the first recognition result specifying a portion of the audio stream that is unrecognized by the rule-based speech recognition;
send the first recognition result to a large vocabulary speech recognition system that applies a statistical-based recognition of the first recognition result and the unrecognized portion of the audio stream; and
receive a response from the large vocabulary speech recognition system, the response comprising a second recognition result that includes a recognition of the unrecognized portion.

10. The system of claim 9, wherein the one or more processors are further operable to send the audio stream and metadata to the large vocabulary speech recognition system.

11. The system of claim 10, wherein the one or more processors are operable to send the audio stream to the large vocabulary speech recognition system by streaming the audio stream to the large vocabulary speech recognition system.

12. The system of claim 10, wherein the one or more processors are operable to simultaneously send the audio stream and perform the rule-based speech recognition of the audio stream.

13. The system of claim 9, wherein the second recognition result comprises a large vocabulary speech recognition system recognition result.

14. The system of claim 9, wherein the first recognition result comprises a plurality of mark-ups specifying a plurality of portions of the audio stream that are not matched with a rule.

15. The system of claim 9, wherein the first recognition result is produced using rule-based grammars.

16. The system of claim 9, wherein the one or more processors are further operable to produce a final result based on the first recognition result and the second recognition result.

17. The system of claim 16, wherein producing the final result comprises replacing the mark-up in the first recognition result with at least a portion of the second recognition result.

18. The system of claim 16, wherein the one or more processors are further operable to perform a task based on the final result.

19. A method for providing speech recognition, comprising:
receiving an audio stream;
processing the audio stream using a rule-based speech recognition of the audio stream using rule-based grammars to generate a first recognition result comprising a rule-matched recognition result of a recognized portion of the audio stream and a mark-up specifying an unrecognized portion of the audio stream;
sending the first recognition result to a remote large vocabulary speech recognition system for applying a statistical-based recognition of the first recognition result and the unrecognized portion of the audio stream;
receiving a response from the large vocabulary speech recognition system, wherein the response comprises a second recognition result produced by the large vocabulary speech recognition system;
producing a final result by replacing the mark-up in the first recognition result with at least a portion of the second recognition result; and
performing a task based on the final result.

20. The method of claim 19, further comprising streaming the audio stream to the large vocabulary speech recognition system simultaneously with performing the rule-based speech recognition of the audio stream.

* * * * *